July 6, 1965  A. C. H. WEISS  3,193,434
DECORATIVE ARCHITECTURAL PANELS AND METHOD OF PRODUCING SAME
Filed July 12, 1961  3 Sheets-Sheet 1

INVENTOR
ALEXANDER C.H. WEISS
BY B.P. Fishleum, Jr.
ATTORNEY

July 6, 1965    A. C. H. WEISS    3,193,434
DECORATIVE ARCHITECTURAL PANELS AND METHOD OF PRODUCING SAME
Filed July 12, 1961    3 Sheets-Sheet 2
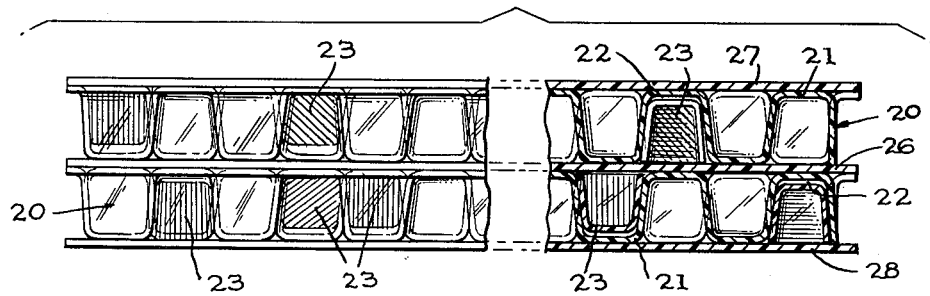
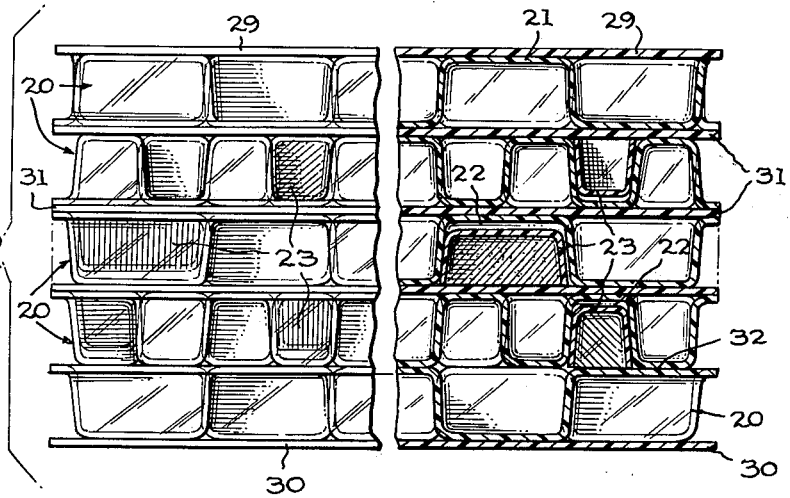
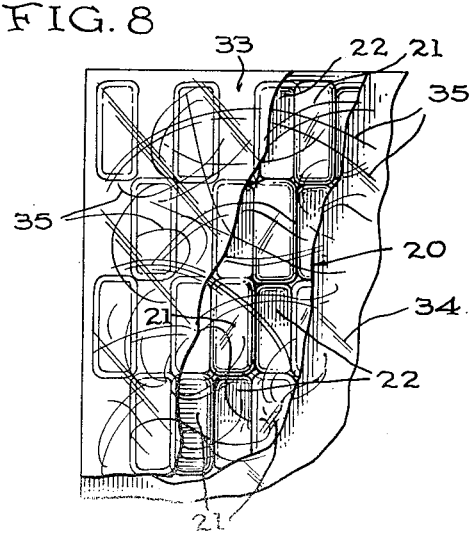
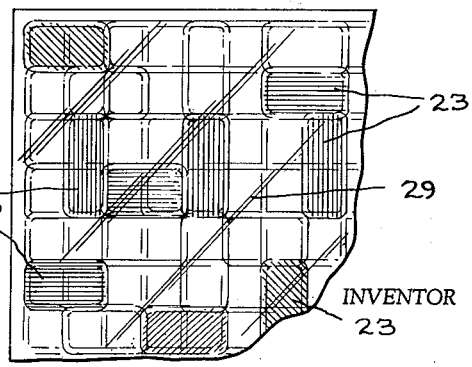
INVENTOR
ALEXANDER C.H. WEISS
BY
B. P. Fishburne, Jr.
ATTORNEY INVENTOR
ALEXANDER C. H. WEISS
BY B. P. Fishleum, Jr.
ATTORNEY United States Patent Office 3,193,434
Patented July 6, 1965

3,193,434
DECORATIVE ARCHITECTURAL PANELS AND
METHOD OF PRODUCING SAME
Alexander C. H. Weiss, P.O. Box 755, Boca Raton, Fla.
Filed July 12, 1961, Ser. No. 123,484
5 Claims. (Cl. 161—6)

This invention relates to architectural ornamental panels and to a method of constructing the same.

An object of the invention is to provide architectural panels of sandwich-type construction formed of translucent plastics material and including simplified and novel means for imparting a colorful ornamental appearance to the panels in a uniform and highly economical manner.

Another object is to provide a structural architectural panel of the sandwich-type formed entirely of thermoplastic sheet material and including a core element having recesses or pockets to contain prefabricated color inserts, assembled therein during the process of manufacturing the panels, and thereby producing a highly unusual and pleasing three dimensional colored effect in the completed panels.

Another object is to provide a novel and simplified method of producing ornamental structural architectural panels of the mentioned type with facility and with the absolute minimum of hand labor and in sections of substantial width and almost indefinite length so that the completed panels may be transported to sites of use in substantial sizes rather than in small segments or blocks.

Still another object is to provide panels of the mentioned type which have maximum strength in all directions due to the provision on the core elements of adequate surface bonding areas on opposite sides thereof, the panels being assembled or laminated by means of heat and pressure and the use of a suitable adhesive vehicle between the layers of the panel structures.

Other objects and advantages of the invention will become apparent during the course of the following description.

Figure 1:
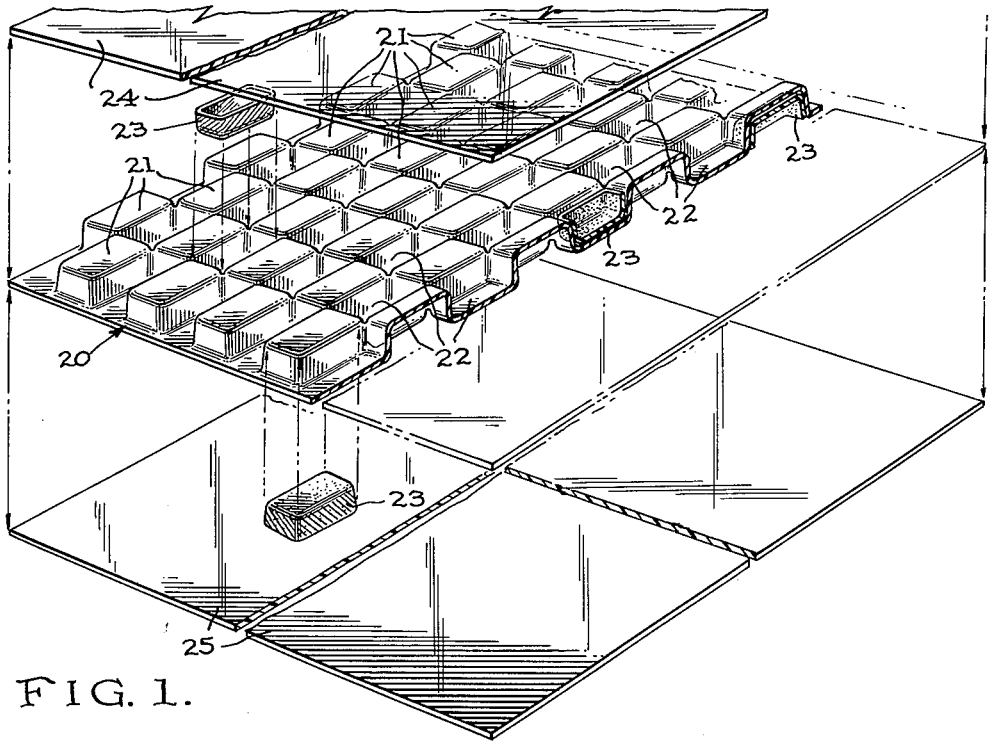
Figure 2:
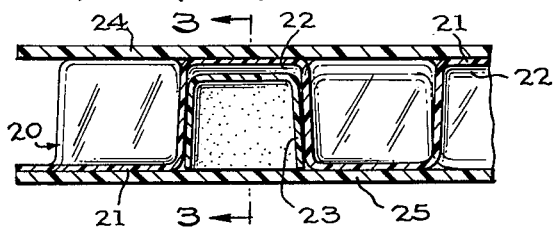
Figure 3:
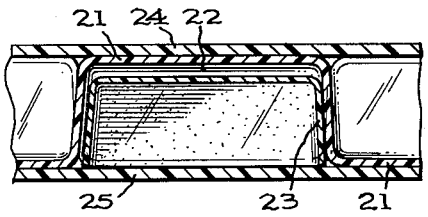
Figure 4:
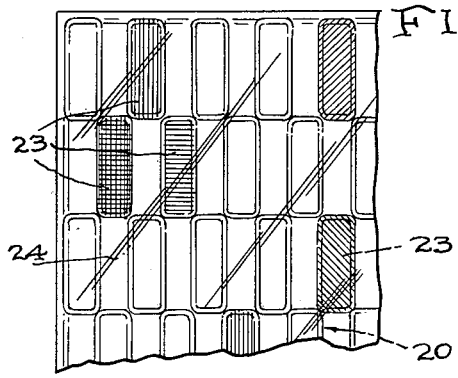

In the accompanying drawings forming a part of this application and in which like numerals are employed to designate like parts throughout the same, FIGURE 1 is a fragmentary exploded perspective view partly in section of a structural architectural panel according to one preferred embodiment of the invention, FIGURE 2 is an enlarged fragmentary vertical cross section through the assembled panel shown in FIGURE 1, FIGURE 3 is a similar view taken on line 3—3 of FIGURE 2, FIGURE 4 is a fragmentary plan view on a reduced scale of the assembled panel according to FIGURES 1 through 3, FIGURE 5 is a similar plan view of a slightly modified form of panel conforming generally to the construction illustrated in FIGURES 1-4, FIGURE 6 is a fragmentary edge elevation partly in vertical section of a modified double thickness panel in accordance with the invention, FIGURE 7 is a similar view of a multi-layer panel according to a further modification of the invention, FIGURE 7a is a fragmentary plan view of the panel illustrated in FIGURE 7, FIGURE 8 is a fragmentary plan view of a panel in accordance with still another modification, FIGURES 9-12 inclusive are edge elevational views, partly diagrammatic, illustrating the steps of the method employed for fabricating the panels according to the invention.

In the drawings, wherein for the purpose of illustration are shown preferred embodiments of the invention, attention is directed first to FIGURES 1-4 inclusive, wherein the numeral 20 designates generally a prefabricated core element formed from a unitary sheet of clear or translucent thermoplastic material by a known vacuum-forming process. The core element 20 is adapted to be formed or shaped in approximately one foot square increments by the vacuum-forming process, and in this manner, the core element may be provided in widths up to about five feet and in substantially indefinite lengths for bonding to cover sheets in accordance with the present invention and in a manner to be described hereinafter.

The core element 20 is formed to provide on opposite sides thereof a multiplicity of uniformly spaced geometrically-shaped and alternately arranged crowns 21 and recesses or pockets 22, which may be rectangular, as shown, triangular, cubical, circular or any other preferred shape. The crowns 21 and pockets 22 are disposed in rows transversely and longitudinally of the core element, as shown, and the crowns 21 on one side of the core element constitute the pockets 22 on the opposite sides thereof, and vice-versa.

The core element 20 is further characterized by having a flat surface area on opposite sides thereof consisting of the collective areas of the outer faces of all of the crowns 21 of the particular side of the core element. Such outer faces, as shown in the drawings, are all disposed in the same plane and collectively constitute about one-half of the total area of each side of the core element 20. The core element thus formed has unusual strength in all directions being rigid, structurally sound, durable yet weighing less than 8 ounces per square foot. The lightweight core makes it possible to produce a very lightweight structural panel when enclosed between cover sheets. This composition of material fabricated to the design illustrated in this patent application will not only produce a panel that is structural and self-supporting, but will exhibit unusually high resistance to deflection upon loading.

In order to provide a unique ornamental colorful appearance to the completed panel, a plurality of separately formed prefabricated cup-like inserts 23 of various colors and preferably translucent and formed of suitable plastics material are introduced in a random pattern arrangement into selected ones of the pockets 22 on opposite sides of the core element 20, as shown in the drawings. The colored inserts 23 are shaped to conform to the pockets 22 and may fit somewhat snugly therein for convenience of assembly. The open sides of the inserts 23 are preferably arranged outermost or adjacent the open sides of the pockets 22, as shown, and the inserts cover substantially the interior surfaces of the pockets in assembly. For a given panel, the inserts 23 may be of a variety of colors or two or three different colors or all of one color, as found desirable, and any preferred number of the colored inserts may be employed in a regular pattern in the pockets 22 or in a random or irregular pattern. Any preferred number of the pockets 22 may be equipped with the colored inserts and any preferred number of the pockets may remain uncolored or empty. No bonding agent, cement or other fastening means is required in connection with the inserts 23, and the same are held within the pockets 22 by a slight wedging or frictional action prior to completing the assembly of the panel by the application of cover sheets to be described to the opposite flat faces of the core element 20.

With continued reference to the drawings, a pair of relatively thin flat translucent thermoplastic cover sheets 24 and 25 are placed over the opposite faces of the core element 20 after assembling the colored inserts 23 therewith, and these cover sheets are coextensive in area with the core element 20 and may completely cover the opposite flat surface areas of the same constituted by the outer faces of the several crowns 21. The cover sheets 24 and 25 are coated upon their inner faces with a suitable adhesive vehicle and are then bonded or laminated to the core element 20 by the simultaneous application of suitable heat and pressure to the opposite sides of the sandwich-like panel structure as depicted in FIGURES 2 and 3. This final assembly process for the panel may be carried out by the use of a heat and pressure applying press, not shown, designed for this purpose. FIGURES 2 and 3 of the drawings are typical cross sectional views of the completed panel structure as thus far described. FIGURE 4 shows a fragmentary plan portion of the completed panel with a random arrangement of the colored inserts 23 having varying colors in the assembly, as shown.

Figure 5:
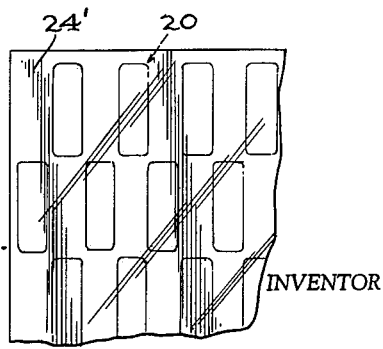

In FIGURE 5, there is shown a slight modification of the invention, wherein one or both of the exterior cover sheets 24' is formed of somewhat translucent frosted thermoplastic material, and the pockets 22 of the core element remain empty or uncolored to produce a very pleasing variation in the ornamental effect of the panel in the presence of light. The colored inserts 23 may also be utilized in conjunction with the frosted translucent cover sheets in the embodiment of FIGURE 5, if preferred, and in this respect various combinations and ornamental effects may be readily produced. The core element 20 and all other parts and the method of assembly for the embodiment of FIGURE 5 is the same as above-described in connection with FIGURES 1–4. In any event, the core element 25 is preferably clear or transparent but may also be frosted or the like, if preferred. As should be obvious in light of the foregoing description, there is no necessity at any time for using coatings or like means for coloring the pockets 22, and the desired color effects are achieved entirely by the use of the preformed and precolored inserts 23 which are very easy to manipulate and remain locked within the panel structure after application of the exterior cover sheets 24 and 25 or 24' to the opposite faces of the core element.

In FIGURE 6, there is illustrated a modification of the architectural panel according to the invention, essentially embodying a pair of the panel structures made in accordance with FIGURES 1–4 and laminated together to form a panel of double thickness.

Specifically, in FIGURE 6, a pair of the prefabricated pocketed core elements 20 previously described are arranged in superposed face-to-face relation with an intermediate flat sheet 26 of translucent thermoplastic material disposed therebetween and coextensive in area therewith. The outer cover sheets 27 and 28 substantially identical with the cover sheets 24 and 25 are provided for covering the outer faces of the two core elements 20. A desired number of the cup-like colored inserts 23 are disposed within the described pockets 22 of the core elements 20 in random pattern to provide any desired number of color variations or designs in the double thickness panel. The sandwich-like panel is bonded or laminated as previously described by the application of suitable heat and pressure to the opposite faces thereof, after coating the sheets 26, 27 and 28 with an adhesive vehicle. The sheets 26, 27 and 28 may be clear or transparent or any or all of them may be frosted or otherwise rendered semi-transparent or translucent, and it should be apparent that within the scope of the invention rather wide variations of ornamental appearance are readily obtainable.

In the embodiment shown in FIGURE 6, as distinguished from the first form of the invention, a unique three dimensional variable ornamental coloring effect is obtainable by virtue of the fact that the colored inserts 23 for the two core elements 20 are disposed in different planes as is apparent by viewing the completed panel edgewise in FIGURE 6. A very unique appearance results when the panel is viewed normal to its flat faces or at an angle to its faces in the presence of light by virtue of the construction shown.

In FIGURE 7, a further modification of the invention is illustrated, embodying a plurality of superposed layers or sections bonded together to produce a relatively thick architectural panel embodying the already mentioned basic features of the invention.

With reference to FIGURE 7, a plurality, such as five, of the core elements 20 are arranged in superposed relation, as shown, but with the major axes of the rectangular crowns 21 of alternate layers disposed at right angles to the axes of the crowns of the other layers of the panel structure. The outer faces of the two outermost core elements 20 are covered in the previously described manner by flat cover sheets 29 and 30, and intermediate flat sheets 31 may, if desired, be disposed between adjacent core elements of the assembly and bonded thereto in the previously-described manner. If preferred, the intermediate sheets 31 may be omitted in FIGURE 7 and the flat faces of the core elements 20 may be bonded together directly as indicated at 32 in FIGURE 7.

The flat sheets 29 and 30 may be clear or frosted as preferred, and the thermoplastic core elements 20 may be clear or semi-transparent or the like. The previously described pockets 22 of the several core elements 20 in FIGURE 7 contain the colored inserts 23 in random pattern or in any desired regular pattern throughout the multiple layers of the panel assembly and to impart to the same a very striking three dimensional varied color effect. The inserts 23 of alternate core elements 20 have their major axes disposed at right angles as shown, and this adds greatly to the ornamental appearance of the particular embodiment of the invention now being dealt with. When the completed panel according to FIGURE 7 is viewed by the observer normal to the opposite flat faces of the same or at a perspective angle thereto, an exceedingly unusual and attractive three dimensional depth effect is noticed due to the arrangement of the variously colored inserts 23 in different layers of the assembly and due to the crossing of the crown portions 21 of alternate core elements 20 in the assembly. The lines of crossing of the crowns 21 are visible within the transparent or translucent assembly and FIGURE 7a of the drawings illustrates the effect insofar as it is possible to show the same effectively in a flat drawing.

In FIGURE 8, there is shown a further variation of the invention, wherein a single core element 20 with or without a desired number of the colored inserts 23 in the pockets 22 thereof is covered in the described manner on its opposite sides by transparent or translucent flat cover plates 33 and 34, bonded thereto by heat and pressure as previously described in connection with the first embodiment of the invention, FIGURES 1–4. In FIGURE 8, between one or both of the cover sheets 33 and 34 and the adjacent flat faces of the core element 20, a multiplicity of random arranged rovings or strands 35 of Fiberglas or the like are disposed. These strands or rovings 35 are permanently sealed within the laminated sandwich-like panel and impart to the same an attractive and unusual ornamental appearance which may be combined with the varied coloring effect of the inserts 23, if the latter are employed in the embodiment of FIGURE 8. The cover sheets 33 and 34 in FIGURE 8 and the core element 20 are preferably formed clear or substantially transparent so as to render the strands 35 clearly visible. As should now be obvious, the ornamental appearance of the architectural panel is capable of being varied widely, as is the thickness of the panel within the scope of the invention. The geometrical shapes of the crowns 21, pockets 22 and colored inserts 23 may be varied to produce interesting ornamental effects within the scope of the invention. The heart of the invention, however, resides in the use of the preformed variously colored inserts 23 within the pockets 22 to provide coloring without the necessity of coating or staining or otherwise conventionally coloring the core element 20 during the fabrication of the panel. The use of the inserts 23 saves much labor and expense during manufacturing and renders almost infinite the number of design patterns and color effects which may be achieved in a single plane or in multiple planes throughout the panel.

Figure 9:
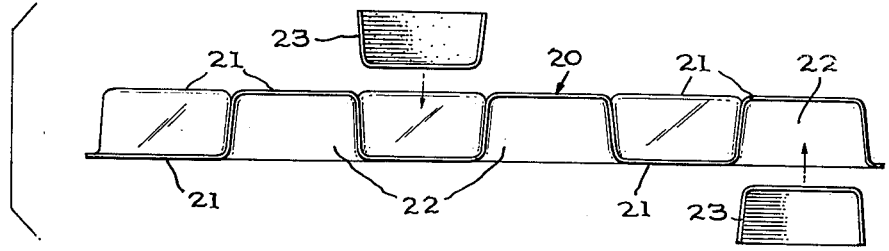

In FIGURES 9 through 12, the basic steps of the method employed for fabricating the panel are diagrammatically illustrated. In FIGURE 9, the core element 20 is shown at the beginning of the method and prior to the insertion of the colored inserts 23 into the pockets 22 on opposite sides of the core element in the desired pattern.

Figure 10:
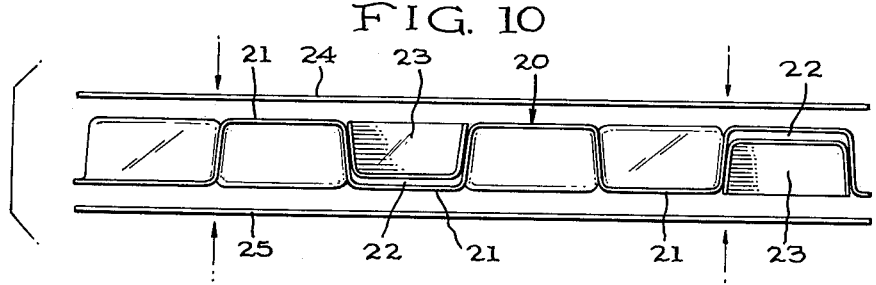

FIGURE 10 shows the core element 20 with the desired number and arrangement of the inserts 23 within the various pockets 22. The exterior cover sheets 24 and 25 are shown in FIGURE 10 prior to application to opposite faces of the core element 20.

Figure 11:
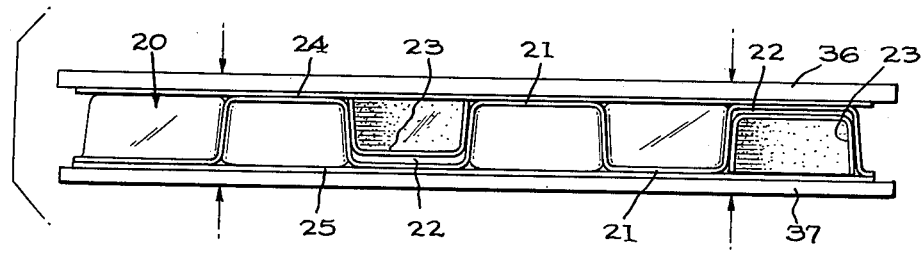

FIGURE 11 shows the cover sheets 24 and 25 brought into registration with the opposite faces of the core element 20 containing the inserts 23, and bonded thereto permanently by the simultaneous application of heat and pressure as previously described. Suitable press means 36–37 is shown operating for this purpose in FIGURE 11.

Figure 12:
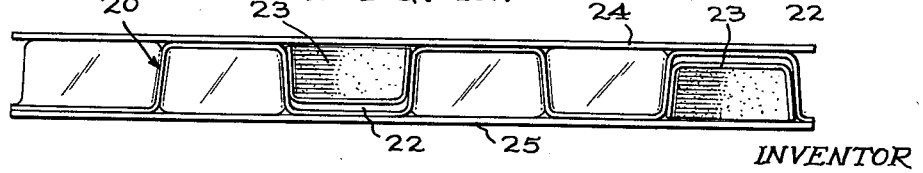

FIGURE 12 shows the completed single layer architectural structural panel according to the first embodiment of the invention, FIGURES 1–4, after the same is removed from the press.

It is to be understood that the forms of the invention herewith shown and described are to be taken as preferred examples of the same, and that various changes in the shape, size and arrangement of parts may be resorted to, without departing from the spirit of the invention or the scope of the subjoined claims.

Having thus described my invention, I claim:

1. A decorative architectural structural panel comprising at least one preformed thermoplastic translucent core element of substantial overall thickness, said core element having a multiplicity of spaced individual pockets in each opposite face thereof and a like number of flat surface portions on each opposite face thereof, said surface portions on each opposite face of the core element being in the same plane and collectively forming on each opposite face a substantial flat surface area for bonding, a plurality of individually preformed variously colored thin sheet material inserts engageable bodily and interchangeably within selected pockets of said core element to form a variable three dimensional color pattern in said panel, said inserts substantially entirely covering the walls of the pockets into which they are placed and thereby creating the illusion of a solid material color filler in each pocket, and at least one flat translucent cover sheet bonded to one face of the core element and covering the open sides of the pockets having said inserts therein and thereby retaining the inserts in said pockets.

2. The invention as defined in claim 1, and wherein said pockets and flat surface portions on each opposite face of the core element are of uniform size and shape and arranged in rows, said pockets and flat surface portions also having a regular geometrical shape throughout the core element.

3. A decorative architectural structural panel comprising a plurality of preformed thermoplastic translucent core elements of substantial overall thickness and arranged in superposed relation in said panel, each core element having a multiplicity of spaced individual pockets in each opposite face thereof and a like number of surface portions on each opposite face, said surface portions on each opposite face lying in the same plane, a plurality of individual variously colored thin sheet material inserts engageable bodily and interchangeably within selected pockets of each core element to form a variable three dimensional color pattern in said panel, said inserts substantially fully covering the walls of the pockets into which they are placed, a translucent flat sheet between opposed faces of the core elements, and additional translucent flat cover sheets on the outer faces of the plural core elements, said core elements and all of said flat translucent sheets bonded together to form a substantially rigid unit, and said sheets retaining said inserts within said pockets.

4. A method of producing a decorative architectural panel comprising inserting variously colored individual thin sheet material inserts selectively in spaced pockets of a preformed translucent panel core element having a multiplicity of said pockets and a like number of spaced surface area portions lying in a common plane produced by the formation of said pockets, said inserts covering substantially the walls of the pockets into which they are inserted to create in the core element a readily variable three dimensional color pattern, and then bonding a flat translucent cover sheet to said surface area portions on at least one side of the panel core element and thereby permanently retaining said inserts in said pockets.

5. The invention as defined by claim 4, and the additional steps of applying a plasticizer to said surface area portions of the panel core element on at least one side thereof and utilizing heat and pressure for bonding together said cover sheet and core element in substantially rigid assembled relationship.

References Cited by the Examiner

UNITED STATES PATENTS

| | | | |
|---|---|---|---|
| 1,886,928 | 11/32 | Wyss | 156—390 |
| 2,033,288 | 3/36 | Kmicic | 161—5 |
| 2,036,021 | 3/36 | Cheney | 161—5 |
| 2,542,581 | 2/51 | Schreffler | 50—266 |
| 2,699,599 | 1/55 | Potchen | 154—45.9 |
| 2,858,247 | 10/58 | De Swart | 161—131 |
| 2,982,042 | 5/61 | Glick | 41—23 |
| 3,086,899 | 4/63 | Smith | 161—131 |
| 3,103,460 | 9/63 | Picket | 161—6 |

EARL M. BERGERT, *Primary Examiner.*

ALEXANDER WYMAN, *Examiner.*